US00RE34383E

United States Patent [19]

Rohring

[11] E Patent Number: Re. 34,383

[45] Reissued Date of Patent: Sep. 21, 1993

[54] ENGINE-SPIRALED, STABILIZED FOOTBALL

[76] Inventor: Daniel Z. Rohring, 904 Walnut Pl., Norman, Okla. 73072

[21] Appl. No.: 753,850

[22] Filed: Sep. 3, 1991

Related U.S. Patent Documents

Reissue of:

[64] Patent No.: 4,923,196
Issued: May 8, 1990
Appl. No.: 261,574
Filed: Oct. 24, 1988

[51] Int. Cl.[5] ..... A63B 43/00; A63H 27/24; A63H 29/20

[52] U.S. Cl. ..... 273/65 EF; 273/DIG. 30; 273/58 G; 446/233; 446/33; 446/56; 446/57; 446/232

[58] Field of Search ..... 273/65 R, 65 E, 65 EC, 273/65 ED, 65 EF, 65 F, DIG. 20; 446/233, 234, 235, 33, 56, 57, 232

[56] References Cited

U.S. PATENT DOCUMENTS 755,446 3/1904 Butcher ..... 446/233
2,605,584 8/1952 Perker et al. ..... 446/250
3,700,239 10/1972 Paterick et al. ..... 273/65 R
3,884,466 5/1975 MacDonald et al. ..... 273/65 EC
4,003,574 1/1977 MacDonald et al. ..... 273/65 EC

*Primary Examiner*—George J. Marlo
*Attorney, Agent, or Firm*—Dougherty, Hessin, Beavers & Gilbert

[57] ABSTRACT

An engine-spiraled, stabilized toy football including a skeleton made up of a plurality of spaced ribs collectively configured as a truncated football. An external skin of strong, thin plastic covers the skeleton. A generally conical zone at each end of the football is not covered by the skin. The circular opening thus formed at one end accommodates an air intake pod. An engine mounting tube is disposed centrally on the interior of the football and is secured to the skeleton of the ball and opens out of the opposite end of the ball from the air intake pod. An engine is secured in the engine mounting tube and drives a propeller housed within a gyroscopic propeller ring. The propeller and gyroscopic ring turn freely within the skeleton and skin, and function to pull air through the air intake pod and force the air out the open end of the engine mounting tube at the opposite end of the ball. A system is provided within the ball for starting and fueling the engine.

16 Claims, 3 Drawing Sheets

ENGINE-SPIRALED, STABILIZED FOOTBALL

Matter enclosed in heavy brackets [ ] appears in the original patent but forms no part of this reissue specification; matter printed in italics indicates the additions made by reissue.

FIELD OF THE INVENTION

This invention relates to toys which depend upon the action of a gyroscope to achieve the effect desired, and more particularly, but not by way of limitation, the present invention pertains to a gyroscopically stabilized toy football in which a miniature *prime mover such as a small* engine is mounted within the ball and drives the gyroscopic element.

BACKGROUND OF THE INVENTION

Brief Description of the Prior Art

A gyroscope, when set in motion, resists forces which tend to change or cause movement of its axis of rotation. Various types of spin-stabilized toys which seem to achieve sustained motions or attitudes relative to the ground, and in apparent defiance of gravity have been heretofore proposed. For example, a spinning top which is gyroscopically stabilized by means of an internal rotating disc is disclosed in Butcher U.S. Pat. No. 755,446.

In Perker et al U.S. Pat. No. 2,605,584, an oblate spheroid-type housing in the form of a football is provided , and a rotatable inertia member is located within the football and is adapted to be powered in rotation by a string which extends externally of the football, and can be pulled to cause rotation of the rotatable inertia member.

In MacDonald et al U.S. Pat. No. 4,003,574, a toy football adapted to be manually thrown through the air is illustrated and described. This football has a generally truncated ellipsoid outer contour, with a Venturi-like nozzle passageway extending through the ball along a line coincident with the major axis of the ball. The ball is alleged to have increased rotational stability, as well as a longer trajectory or flight path, when it is manually thrown. This is a result of the truncated ellipsoidal shape of the ball, in conjunction with the air passage formed through the ball coincidental with the major axis of the ball. The outer wall of this ball is formed of a generally lightweight or low density plastic. It is additionally preferred that the outer surface of the ball be coated with a low coefficient of friction material to reduce air drag as the ball moves through the air.

A similar concept is depicted and described in MacDonald et al U.S. Pat. No. 3,884,466.

U.S. Pat. No. 3,700,239 to Paterick et al discloses a football which has an outer shell constructed so that the axis of an internally contained gyroscope is coincident with the longitudinal axis of the football. The gyroscope is mounted within the ball by means of brackets which suspend it in the center of the football, and it is actuated by means of a gear rack which is inserted through a passageway projecting through the external skin and into the center of the football. The gear rack has teeth which intersect the gear rack of a pinion gear carried by the gyroscope. The axis of rotation of the internal gyroscope is coincident with the axis of rotation of the football when the football is thrown with a spiral motion. The gyroscopic stabilization realized with this construction enables a nearly perfect spiral rotation to be achieved during flight of the football. The external shell of this football is constructed of a durable, relatively flexible plastic material.

Insofar as I am aware, no prior art toy football has utilized an artificial propulsion system which concurrently affords a propulsive force increasing the length of the trajectory of the ball, while simultaneously providing a gyroscopic stabilization of the spiraling of the ball during its flight.

BRIEF DESCRIPTION OF THE PRESENT INVENTION

The present invention comprises a toy football which is very amusing and entertaining to play with because of the reactions of the ball to certain internal mechanisms which give it certain enhanced properties which cannot be derived from an ordinary football. These characteristics, are, broadly described, (a) a gyroscopic stabilization of the ball, such that it is self-spiraling and tends to maintain a true trajectory as a result of an internal free spinning engine propeller which is not connected to the remainder of the ball, except through the drive shaft of the engine, and (b) the propulsive effect developed by the propeller of the engine as it pulls air through the forward end of the football and discharges it through a discharge tube at the rear end of the football.

Broadly described, the present invention includes a generally football-shaped skeleton made up of a series of spaced lightweight plastic or synthetic resin ribs which extend from one end of the toy football to the other, and develop the outline of the football, except for truncated ends where the generally conical tips normally disposed at each end of the ball have been omitted. The skeleton of the ball thus defines a circular opening at each end of the ball. The skeleton is covered with a very strong lightweight plastic paper which forms the external cover of the ball.

Disposed centrally within the ball is a very small *prime mover such as an* internal combustion engine which powers a propeller. The engine is supported in an engine-mounting tube which in turn is connected to, and mounted centrally within, the skeleton and along the longitudinal axis of the ball. Means are provided to permit air to be drawn by the engine propeller through one end of the football and discharged through a tube having a discharge opening at the other end of the football.

The propeller is mounted within and is preferably connected to a gyroscopic ring, and rotates freely within the skeleton. The engine, on the other hand, is connected to the skeleton so that as the propeller turns, and a reaction is developed through the engine to the skeleton, a gyroscopic effect is realized which stabilizes the football in its spiraling motion during flight. Means is provided within the football to supply fuel for a limited time to the engine, and the engine is also provided with a socket means by which the engine can be started from an exterior location. The *prime mover driven or* engine-spiraled toy football of the invention can be advantageously and pleasurably used by children and adults who enjoy sports activities in which they participate, and the toy is simple to use and requires no special training to do so.

Another object of the invention is to provide a toy football which is very light in weight.

Another object of the invention is to provide a toy football which is gyroscopically stabilized in flight.

A further object of the invention is to provide a gasoline engine-propelled toy football which can be thrown substantially further than a normal football because of the supplemental propulsion afforded by the internal engine.

A further object of the invention is to provide a gasoline engine powered toy football which can carry a small and safe supply of gasoline fuel to power the internally located engine, with the gasoline located in a protected position in the interior of the football.

A further object of the invention is to provide a toy football which, when thrown in the regular way to cause the ball to undergo a spiraling motion, will be directed more truly to its target due to the stabilizing effect of the counterrotating engine which rotates in a direction opposite the direction of rotation of its propeller, and carries with it the ball skeleton and overlying skin.

Another object of the invention is to provide a toy football which enables the thrower, by reason of artificial supplemental propulsion, to throw the ball further than such a toy football could normally be thrown.

A further object of the invention is to provide a toy football which is of rugged construction, and can withstand shocks and jolts and sudden impacts of substantial destructive force without serious damage, and which is characterized in having a long and trouble free operating life.

Additional object and advantages of the invention will become apparent as the following detailed description of a preferred embodiment of the invention is read in conjunction with the accompanying drawings which illustrate such preferred embodiment.

GENERAL DESCRIPTION OF THE DRAWINGS

DETAILED DESCRIPTION OF A PREFERRED EMBODIMENT OF THE INVENTION

Figure 1:
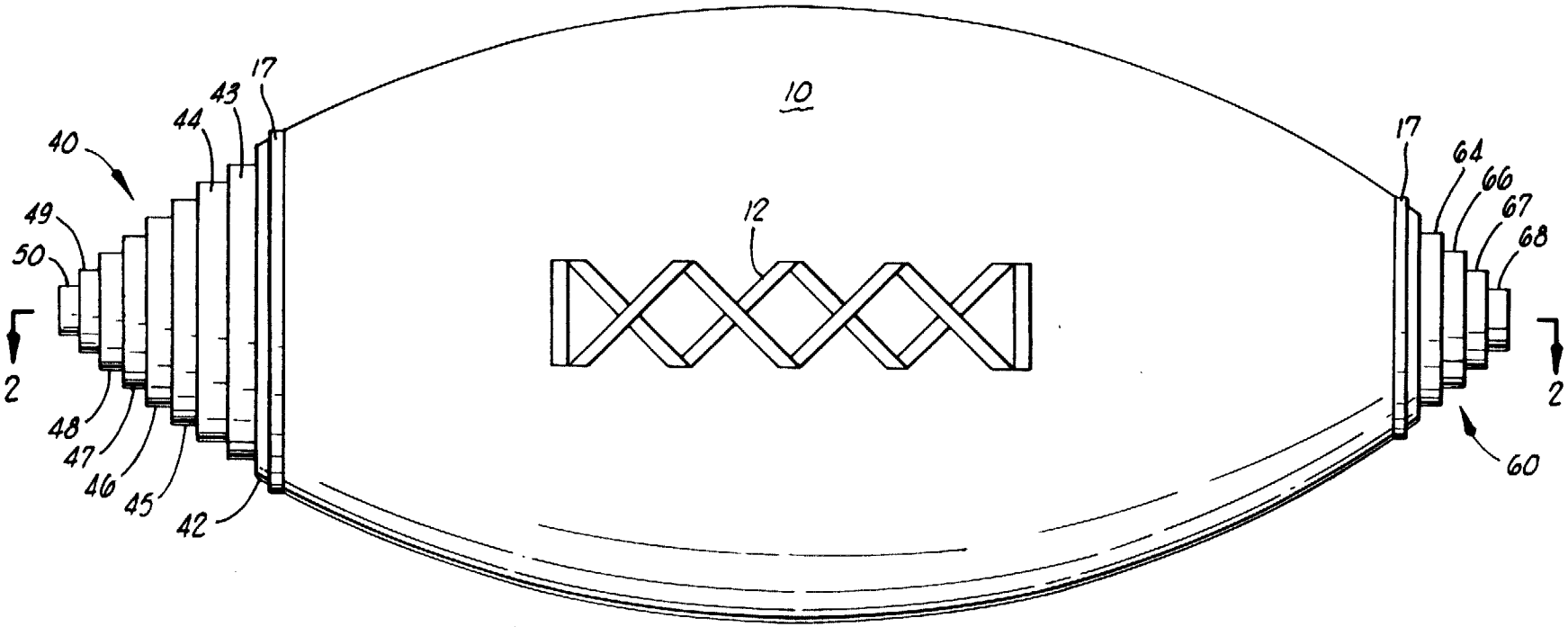
FIG. 1 is a side elevation view of a toy football constructed in accordance with the present invention, and illustrating one embodiment of the football as it appears from the exterior of the ball.

The toy football of the invention is illustrated in FIG. 1 of the drawings. The football can be utilized in the form shown, or a pair of generally conically-shaped wire mesh screens can be secured to opposite ends of the ball in a manner and for a purpose hereinafter described. The football is in the familiar oblate spheroid configuration characteristic of footballs, and includes an outer skin 10 which has formed thereon raised ridges 12 which simulate both to the eye and to the touch, the laces which are to be found on one side of a football.

The external skin 10 is a lightweight, very tough, substantially non-tearable flexible plastic paper. It covers an internal skeleton designated generally by reference numeral 14 and partially illustrated in FIG. 2 of the drawings. The skeleton 14 and skin 10 do not extend to end points of completion of the oblate spheroid figure at opposite ends of the football, but rather, the spheroid is truncated at its opposite ends, having the generally conically-shaped ends removed for a purpose hereinafter described. The skeleton 14 includes a plurality of elongated arcuate ribs 16 which are circumferentially spaced from each other around the football, extend from one truncated end to the other, and are made of a lightweight, mechanically strong, resilient plastic material. This material, though resilient, has sufficient stiffness to retain the shape desired in the football. The skeleton 14 can yield under otherwise damaging impacts, and then resiliently returns to the illustrated configuration. At each of their opposite ends, the ribs are joined to the two end rings 17.

At its opposite ends, the skeleton 14, covered by the skin 10, defines by the pair of end rings 17, a pair of circular openings 20 and 22. The opening 20 at the forward end of the ball constitutes an air intake opening, and the opening 22 at the opposite or rear end of the ball constitutes an air discharge opening. The opening 22 also functions as an opening which facilitates the removal of the engine, and the engine-mounting tube, designated generally by reference numeral 24 and illustrated in FIG. 2, and hereinafter described in greater detail.

A funnel-shaped, truncated cone-shaped power pod is centrally positioned within the football and extends along the major end- to-end longitudinal axis thereof, and is designated generally by reference numeral 26. The frustoconical power pod 26 terminates at its forward end in a cylindrical throat 28 which is concentric with respect to the major axis of the football, and opens at the circular air intake opening 20 formed within the skeleton 14 at the forward end or nose of the ball. The converging Venturi portion 30 of the power pod 26 extends inwardly to a cylindrical, axially extending housing 32. The cylindrical housing 32 is connected to the small end of the truncated conical Venturi funnel portion 30, and extends coaxially therewith and coaxially with the major axis of the football.

The cylindrical housing 32 is joined at its end nearest the circular air discharge opening 22 to a cylindrical seating collar 34 which is secured to the annular end ring 17 which defines the opening 22, and is at the truncated end of the skeleton 14. A radially extending seating shoulder 36 extends between the seating collar 34 and the cylindrical housing 32. It will be perceived that if the attitude of the football during flight is such that the air intake circular opening 20 is always at the leading or forward end of the football, air will move inwardly through the cylindrical throat 28, through the Venturi-truncated cone section 30, through the cylindrical housing 32 and out of the seating collar 34 by way of the air discharge opening 22.

Figure 5:
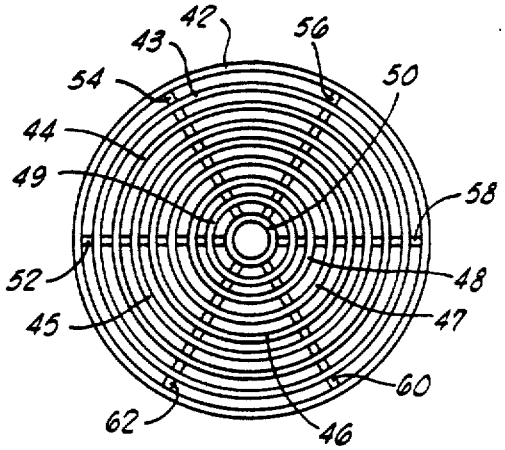
FIG. 5 is an end elevation view of the structure shown in FIG. 4.
Figure 6:
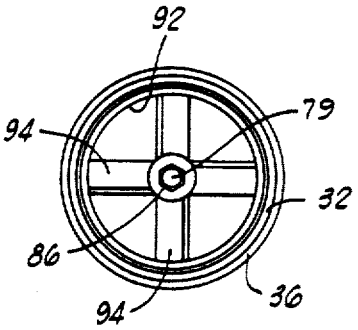
FIG. 6 is a sectional view taken along line 6—6 of FIG. 2.

A multi-tubular air filtering grill assembly, designated generally by reference numeral 40, is pressed into the opening 20 at the forward end or nose of the ball. The air filtering grill assembly 40 includes an outermost cylindrical tube element 42 dimensioned to fit within the cylindrical throat 28, and to be frictionally retained therein. It is seated against a shoulder 41 at the rear of the cylindrical throat 28. There are then further provided in the multi-tubular air filtering grill assembly 40, a plurality of concentric, cylindrical tubular elements 43, 44, 45, 46, 47, 48, 49 and 50 which are of gradually increasing length. The several concentric tubular members 42–50 are made to terminate at their ends outside the football at progressively extended locations such that the grill assembly 40 describes the conical end portion or tip of the football which is not defined by the skeleton 14 and the skin 10 which covers it. A relatively fine mesh screen of conical shape (not shown) may be placed over the air filtering grill assembly 40 if desired. The filtering grill assembly 40 further includes a plurality of radially extending spider ribs or spokes 52–62 (see FIG. 5) which function to retain the several concentric cylindrical tubular elements 42–50 in their concentric relationship so that there is substantially equal radial spacing between the several cylindrical tubular elements in the grill assembly.

The material of which the grill assembly 40 is constructed is preferably a strong, lightweight plastic material which has sufficient resilience that it can absorb impacts which may result from the football hitting upon its nose, or hitting a player's helmet, or encountering various other types of destructive shock forces. As will be subsequently explained, the annular spaces between the several concentric cylindrical tubular elements 42–50 function to provide flow passageways for the free flow of air which enters through the nose or forward end of the football.

Figure 2:
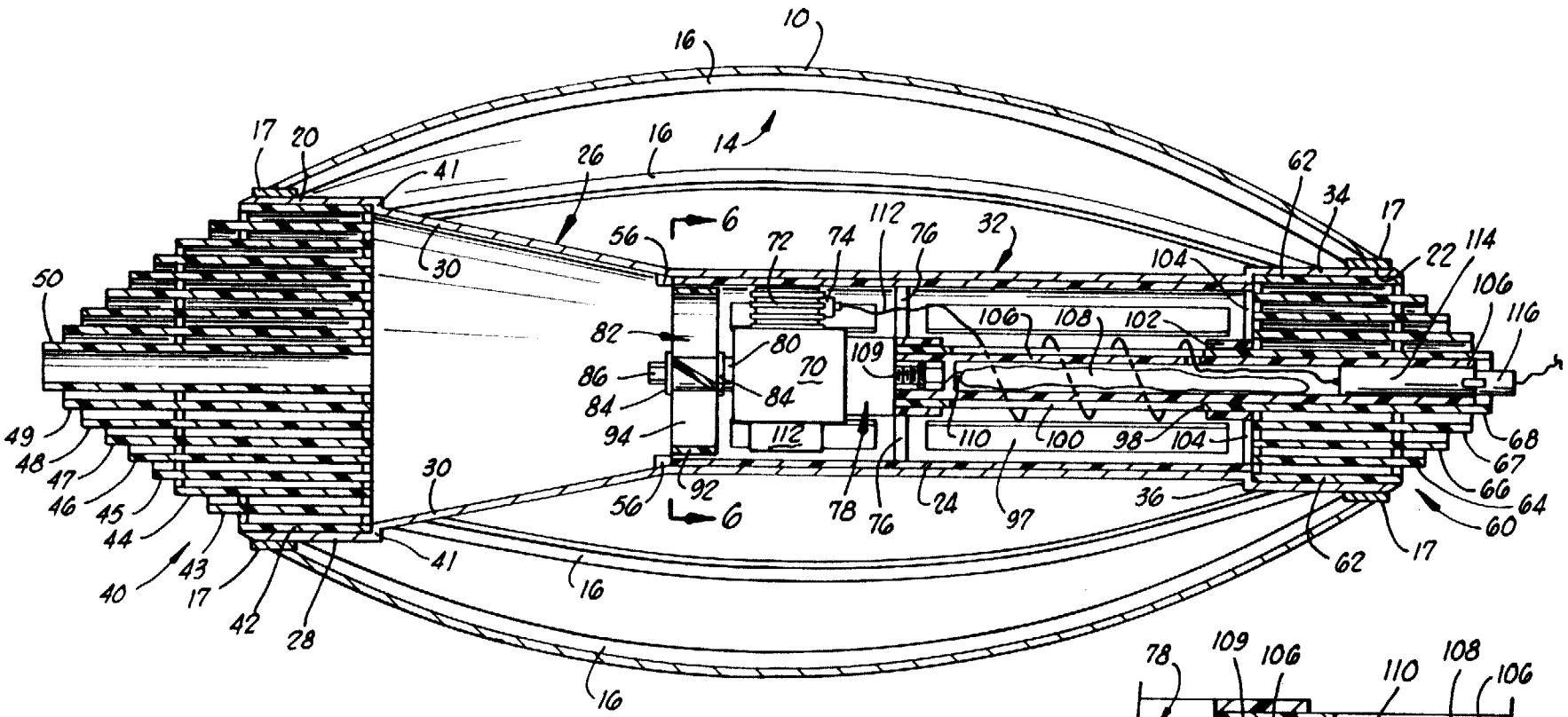
FIG. 2 is a sectional view taken along line 2—2 of FIG. 1, and showing the interior construction of the toy football.

It will be noted in referring to FIG. 2 that the engine mounting tube 24 fits snugly and slidably within the cylindrical housing 32. The engine mounting tube 24 can, however, be slidably reciprocated within the cylindrical housing 32 for the purpose of removing it for maintenance or replacement as hereinafter described. In mounting the engine mounting tube 24 within the football, it is pushed into the cylindrical housing 32 from the rear end of the ball until the engine mounting tube engages an annular stop detent 56 which is located at the intersection of the cylindrical housing 32 and the frustoconical Venturi throat of the power pod 26. It will be noted that when the end of the engine mounting tube abuts the annular stop detent 56, the opposite end of the engine mounting tube terminates in radial alignment with the radially extending seating shoulder 36.

Figure 7:
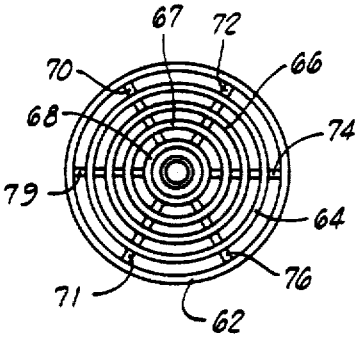
FIG. 7 is an end elevation view of the discharge end of the tube forming a portion of the engine mounting tube, showing the same as it appears when viewed from the end of the football from which it protrudes.

At the rear end of the football, the circular air discharge opening 22 located there is closed by means of a multi-tubular air discharge grill assembly 60. The multi-tubular air discharge grill assembly 60 includes an outer cylindrical member 62 which slidably fits within the cylindrical seating collar 34 and is seated against the shoulder 36. The grill assembly 60 further includes a plurality of varying length, concentrically disposed, radially inner tubular elements 62–68. The several tubular or cylindrical elements 62–68 which make up the discharge grill assembly 60 are radially spaced and retained in their concentric relation with respect to each other by means of a plurality of spokes or spider elements 70–79 (see FIG. 7). As in the case of the concentric cylindrical tubular elements 42–58 which make up the air filtering grill assembly 40, the several concentric tubular elements 62–68 terminate with their ends positioned to form the outline of the conical tip required to be located at the rear or trailing end of the football in order to impart to it its conventional and well known oblate spheroidal configuration. The tubular element 70 is quite elongated and extends from the rear end of the ball forwardly and inwardly to the internal combustion engine as hereinafter described.

The internal propulsion system used in the toy football includes a small gasoline engine 70 which includes a cylinder head 72 and an ignition glow plug 74. The gasoline engine 70 is mounted within the engine mounting tube 24 by means of a plurality of radially extending supporting elements 76 which bear against, and are secured to, an engine housing extension, designated generally by reference numeral 78. The engine housing extension 78 includes an interior gas tank intake manifold (not visible).

At the opposite side of the engine 70 from the engine housing extension 78 is a power shaft 80 which carries a multiple bladed propeller, designated generally by reference numeral 82. The propeller is retained between a pair of annular, axially spaced stop flanges 84 by means of a securing nut 86 which is secured on the shaft 80, and has a hexagonal external configuration. The propeller 82 is concentrically surrounded by a gyroscopic ring 92, which ring is preferably secured to the outer tips of the several propeller blades 94 to enhance the gyroscopic action which imparts stability to the spiraling football. The propeller 82 and the gyroscopic ring 92 are disposed within the forward end of, and spaced radially inwardly from, the engine mounting tube 24, and are located adjacent the frustoconical Venturi throat 30 of the power pod 26.

Figure 3:
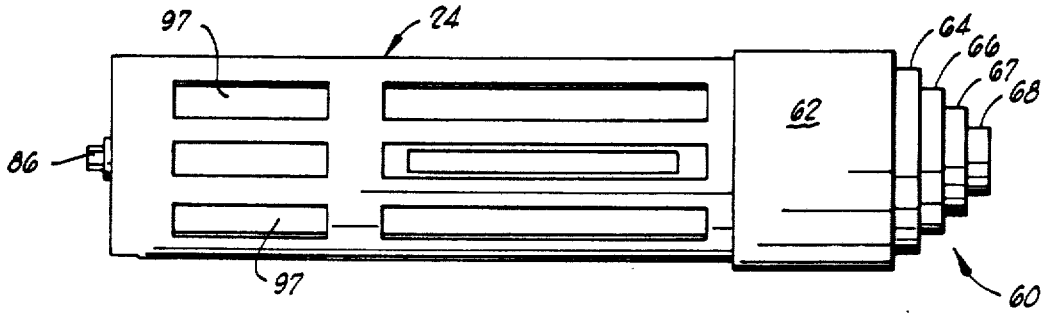
FIG. 3 is a view in side elevation of an engine mounting tube forming a part of the invention, and used to mount and support on the interior of the football, the engine which functions to provide supplemental propulsion to the ball.
Figure 4:
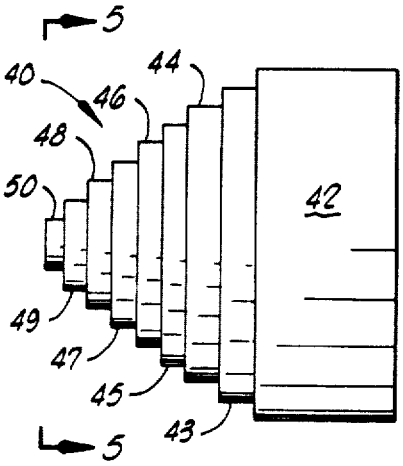
FIG. 4 is a side elevation view which illustrates a nose plug in the form of an air intake grill assembly used at one end of the football to provide an air intake screen, and to give geometric definition to the football.

It will be noted in referring to FIGS. 2 and 3 that the elongated engine mounting tube 24 may be joined to the grill assembly 60 as shown, and is provided with a plurality of longitudinally extending, circumferentially spaced slots 97 formed therein, as shown in FIG. 3. This reduces the overall weight of the assembly, and allows the engine mounting tube 24 to more effectively expand and contract in reaction to the impingement of hot exhaust gases from the engine 70.

An elongated tubular sleeve 98 projects toward the rear end of the football from the engine housing extension 78 and has a plurality of slots 100 formed therein as shown in FIG. 2. The tubular sleeve 98 is retained in position by insertion of its forward end into the engine housing extension 78, and by the encircling of a midportion of the tubular sleeve by a cylindrical collar 102.

The cylindrical collar 102 is retained centered within the engine mounting tube 24 by a series of radial ribs or braces 104. The tubular sleeve 98 carries an external thread 105 at its forward and inner end which enables it to be threaded into a internally threaded receiving socket formed in the engine housing extension 78.

Figure 2A:
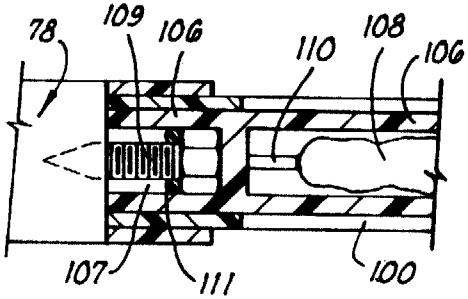
FIG. 2a is an enlarged view of certain details of structure shown in FIG. 2.

Mounted within the tubular sleeve 98 is an elongated fuel and ignition tube 106. The fuel and ignition tube 106 contains an elongated small diameter flexible fuel bladder 108 which has a fuel line 110 extending from the forward end thereof to the intake manifold (not shown) of the gasoline engine 70 (see FIG. 2a). The ignition tube 106 has a hexagonally configured socket 107 at its forward end adjacent the engine 70 and this socket receives the hexagonally-shaped head of a needle valve 109. The needle valve 109 functions to allow the mixture of fuel and air to be adjusted to adjust the richness of the fuel charged to the engine, thus to fine tune the engine once it is started. The inner end (not shown) of the needle valve 109 threads into a fuel orifice within the intake manifold of the engine and by rotating the fuel and ignition tube 106, the needle valve can be slightly rotated to tune the engine by adjusting the fuel mixture. An O-ring 111 is secured around the threaded shank of the needle valve as shown in FIG. 2a. An ignition lead wire 112 extends from the ignition glow plug 74 rearwardly around the tubular sleeve 98, through one of the slots 100, into the ignition tube 106 and is connected to a female ignition socket 108. The female ignition socket 114 receives a male jack 116 which is connected to a suitable battery for providing a suitable current at 1½ volts to the glow plug 74 used to provide the ignition in the engine 70.

OPERATION

In the operation and use of the invention, the fuel bladder 108 is filled with gasoline or a suitable internal combustion engine fuel. The bladder will normally be filled through the fuel line 110 while the engine and fuel system are removed from the interior of the ball, but the bladder may also be replaced after each flight, since it of relatively inexpensive material and holds a relatively small amount of fuel. In the former case, refueling of the flexible fuel tank is accomplished when the engine assembly contained within the engine mounting tube 24 has been removed by sliding the engine mounting tube 24 rearwardly to extricate it from the football as it is removed from the cylindrical housing 32.

At this time, it is also possible to replace the ignition glow plug 74, if this is needed. When the engine assembly has been prepared for operation, the engine mounting tube 24 and the engine assembly are replaced within the cylindrical housing 32 by pushing the engine mounting tube forwardly within the cylindrical housing until the forward end of the engine mounting tube abuts the annular stop detent 56. Concurrently, the multi-tubular air discharge grill assembly 60 is pressed into its position illustrated in FIG. 2. In this position, the assembly 60 functions to retain the engine assembly, including the engine mounting tube 24, in its operative position.

The engine 70 may now be started by utilizing an elongated starting chuck, having a hexagonal socket on one end thereof, and having a cordless rotary drill drivingly connected to its other end. The elongated chuck is inserted through the tube 50 forming a part of the multiconcentric air filtering grill assembly 40. The hexagonal socket of the chuck engages the hexagonal nut 86. The starting chuck can then be energized by pressing the trigger of a cordless rotary drill to which it is attached so as to cause the chuck to rotate rapidly. This will cause the engine 70 to fire and start in the usual manner of internal combustion engines. After the engine 70 has started, the chuck is withdrawn through the tube 50.

With the engine now rotating, the fuel and ignition tube 106 can be rotated to fine tune the engine operation as desired. At this time, the propeller 82 and the gyroscopic ring 92 which surrounds it and is preferably secured to the tips of the propeller blades 94 undergo high speed rotation. This causes a stabilizing effect which tends to retain the football in a constant attitude about its longitudinal axis, and this is of advantage as the flight of the football commences after it has been passed. If the football is passed with the conventional spiraling motion, the stabilizing effect of the propeller 82 and the stabilizing gyroscopic ring 92 help to maintain a near perfect spiraling motion by the football over its entire flight trajectory.

Concurrently with the operation of the engine 70 and the rotation of the propeller 82, air is drawn through the multiconcentric tubular grill assembly 40, and passes through the fructoconical Venturi throat of the power pod 26. The air continues past the propeller 82 and enters the engine mounting tube 24. The air can pass by the radial braces 76 and continue to move rearwardly in the engine mounting tube 24.

At the rear end of the engine mounting tube 24, the air which is drawn through the openings in the grill 40 at the nose of the football is discharged through the annular spaces between the several concentric tubular elements 62–68 of the air discharge grill assembly 60. Thus, a propulsive effect is realized as a result of the intake of air, the compression of the air through the Venturi throat and the discharge of the air through the opening 22 at the rear of the football. This enables the football to be thrown a substantially greater distance than would be the case of a toy football having no internal power system.

The football can be used for playing regular football, and the gasoline supplied by the small bladder fuel tank 108 is adequate to last a reasonable period of time.

The toy football of the invention is ruggedly constructed, and provides, in addition to the amusement generally associated with play utilizing a regular and conventional toy football, the pleasure and educational benefit of understanding the small internal combustion engine located interiorly of the ball, and the gyroscopic effect obtained by the way the engine 70 and propeller 82 are constructed in relation to the remainder of the structural elements employed in the football.

Although a preferred embodiment of the invention has been herein described, and is illustrated in the drawings which are provided with the application, it will be understood that various changes can be made in the illustrated structure without departure from the basic principles which underlie the invention. Changes and innovations of this type are therefore deemed to be circumscribed by the spirit and scope of the invention, as such are determined by, and based upon, the subsequent claims when they are given a reasonably expansive and liberal interpretation.

I claim:

1. A football comprising:

a hollow, open ended oblate spheroidal body having a nose at one end and having a central longitudinal axis extending from said nose to the opposite end of the oblate spheroidal body;

air flow passageway means extending from said nose along said longitudinal axis and opening at the end of said body opposite said nose;

[an engine] *a prime mover* mounted centrally in said oblate spheroidal body and connected for movement therewith about said longitudinal axis;

a propeller drivingly connected to said [engine] *prime mover* and position to impel air through said air flow passageway means from the nose to the opposite end of said oblate spheroidal body, said propeller mounted for rotation about said longitudinal axis and rotatable free of said oblate spheroidal body.

2. A football as defined in claim 1 wherein said oblate spheroidal body comprises:

an external skin;

a skeleton including a plurality of ribs extending from one end of the body to the other and supporting said skin; and said skeleton and skin defining a generally circular opening adjacent each of the opposite ends of the body at opposite ends of said central longitudinal axis.

3. A football as defined in claim 2 wherein said oblate spherical body further comprises:

a conically-shaped, multi-tubular air filtering grill assembly fitted into, and closing, the opening at the nose end of the skeleton; and a conically-shaped multi-tubular air discharge grill assembly fitted into, and closing, the opening at the end of the skeleton opposite the air filtering grill assembly.

4. A football as defined in claim 1 and further characterized as including a gyroscopic ring secured around said propeller in a position concentric to the axis of rotation of the propeller.

5. A football as defined in claim 1 [and] *wherein said prime mover is an internal combustion engine* further characterized as including a fuel bladder mounted within said body adjacent said engine.

6. A football as defined in claim 1 wherein said air flow passageway means comprises:

a power pod connected to said body and including:

a cylindrical throat opening adjacent the nose of the body and having a forward end and a rear end; and a converging Venturi portion of frustoconical configuration having a relatively large forward end joined to the rear end of said cylindrical throat, and having a relatively small diameter rear end; and an elongated cylindrical housing connected to said body having a forward end connected to the relatively small diameter rear end of said Venturi portion for receiving air therefrom and having a rear end opening at the end of said body opposite said nose.

7. A football as defined in claim 1 wherein said air flow passageway includes an elongated cylindrical housing mounted centrally and coaxially in said body and connected to said body for movement therewith; and wherein *said prime mover is an internal combustion engine and wherein* said football further includes:

an engine mounting tube slidably and removably mounted in said elongated cylindrical housing and surrounding said engine.

8. A football as defined in claim 7 wherein said air flow passageway further includes:

a power pod connected to said body and including:

a cylindrical throat opening adjacent the nose of the body and having a forward end proximate said nose of the body and a rear end distal with respect to said nose; and a converging Venturi portion of frustoconical configuration having a relatively large diameter forward end connected to the rear end of said cylindrical throat, and having a relatively small diameter rear end connected to one end of said cylindrical housing; and a cylindrical seating collar secured to the opposite end of said cylindrical housing from its end connected to said Venturi portion.

9. A football as defined in claim 1 [and] *wherein said prime mover is an internal combustion engine* further characterized as including engine starting means connected to said propeller and adapted to facilitate crank starting said engine from a position outside said body while said engine is centrally located in said oblate spheroidal body.

10. A football as defined in claim 9 wherein said engine starting means comprises:

a guide tube projecting from said nose axially into said body in line with the axis of rotation of said propeller; and a polygonally configured nut on said longitudinal axis adjacent said propeller and securing said propeller on said engine.

11. A toy adapted to be manually propelled through the air comprising:

a body having a hollow interior and having a first end defining an opening at one side of the body, and said body having a second end defining a second end at the opposite side of said body from said first end;

elongated air flow passageway means extending between said first end of the body and said second end of the body, said air flow passageway means comprising:

an elongated cylindrical housing located inside said body and secured to said body and opening at said second end of the body at said second opening, and extending from said second end toward said first end; and a Venturi element having a portion of frustoconical configuration with a relatively large end joined to, and communicating with, said opening defined by said first end of the body for receiving air from outside said body, and said frustoconical portion further including a small end connected to said elongated cylindrical housing for charging air thereto; and an engine mounted in said cylindrical housing and secured to said cylindrical housing for movement with said cylindrical housing and with said body; and a propeller driven by said engine and rotating free of said body, said propeller being positioned near the small end of the frustoconical portion of said Venturi element for drawing air through said Venturi element and into said cylindrical housing.

12. A toy as defined in claim 11 wherein said body comprises:

a plurality of rigid ribs extending around and defining said hollow interior; and a skin covering said rigid ribs.

13. A toy as defined in claim 11 and further characterized as including a fuel tank removably mounted in said cylindrical housing and connected to said engine for charging fuel thereto.

14. A football comprising:

a body shaped as an oblate spheroid having a forward nose end and an opposite rear end and defining a hollow zone at the center thereof;

an internal combustion engine mounted in said hollow zone and connected to said body for movement with said body;

a fuel tank mounted in said hollow zone and connected to said internal combustion engine for supplying fuel thereto;

means for venting exhaust gases from said engine to the outside of said oblate spheroid body;

a propeller drivingly connected to said engine for rotation about the longitudinal axis of said oblate spheroid body; and means on said propeller adapted for connection to a rotary engine starting tool.

15. A football as defined in claim 14 wherein said means for venting exhaust gases comprises an elongated cylinder surrounding said engine and opening at said opposite end of said oblate spheroid shaped body.

16. A football as defined in claim 15 wherein said body comprises:

a skeleton of generally truncated oblate spheroidal configuration and comprising:

a plurality of elongated, spaced ribs extending from the nose end to the opposite end of said body;

circular rings secured to said ribs at opposite ends of the body and defining a circular opening at the nose, and a circular opening at the opposite rear end of the body; and an external skin covering said skeleton and giving said body is oblate spheroid configuration.

* * * * *